US008289946B2

(12) United States Patent
Luo et al.

(10) Patent No.: US 8,289,946 B2
(45) Date of Patent: Oct. 16, 2012

(54) REFERENCE SIGNAL GENERATION IN A WIRELESS COMMUNICATION SYSTEM

(75) Inventors: Tao Luo, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1077 days.

(21) Appl. No.: 12/190,889

(22) Filed: Aug. 13, 2008

(65) Prior Publication Data

US 2009/0135803 A1    May 28, 2009

Related U.S. Application Data

(60) Provisional application No. 60/955,801, filed on Aug. 14, 2007.

(51) Int. Cl.
*H04J 3/06* (2006.01)
(52) U.S. Cl. ........ 370/350; 370/208; 370/503; 380/268; 380/270
(58) Field of Classification Search .......... 370/350, 370/335, 503, 252, 208; 380/270, 268; 375/260, 375/267
See application file for complete search history.

(56) References Cited

U.S. PATENT DOCUMENTS

| 7,099,366 | B2 | 8/2006 | Umeno | |
|---|---|---|---|---|
| 7,352,704 | B1* | 4/2008 | Toussi et al. | 370/238 |
| 7,535,972 | B2* | 5/2009 | Hammerschmidt et al. | 375/295 |
| 2002/0191568 | A1* | 12/2002 | Ghosh | 370/335 |
| 2004/0131007 | A1* | 7/2004 | Smee et al. | 370/208 |
| 2005/0084112 | A1* | 4/2005 | Kim et al. | 380/268 |
| 2005/0128934 | A1* | 6/2005 | Gu et al. | 370/206 |
| 2005/0281290 | A1* | 12/2005 | Khandekar et al. | 370/500 |
| 2006/0009227 | A1* | 1/2006 | Cudak et al. | 455/450 |
| 2006/0028976 | A1* | 2/2006 | Park et al. | 370/203 |
| 2006/0285479 | A1* | 12/2006 | Han et al. | 370/203 |
| 2007/0183391 | A1* | 8/2007 | Akita et al. | 370/350 |

(Continued)

FOREIGN PATENT DOCUMENTS

EP             1729467           12/2006

(Continued)

OTHER PUBLICATIONS

International Search Report, PCT/US08/073206, International Search Authority, European Patent Office, Nov. 20, 2008.
Written Opinion, PCT/US08/073206, International Search Authority, European Patent Office, Nov. 20, 2008.
Dorot, V., et al., "An Explanatory Dictionary of Modern Computer Terms," 2nd Edition, BHV-Petersburg Publishers, Saint Petersburg, 2001, 'Program Product' on p. 339.

(Continued)

*Primary Examiner* — Ricky Ngo
*Assistant Examiner* — Rasheed Gidado
(74) *Attorney, Agent, or Firm* — Liem T. Do

(57) ABSTRACT

Techniques for generating reference signals in a wireless communication system are described. A set of Q reference signal sequences may be generated based on G pseudo-random sequences and L scrambling sequences, where Q=G·L, G>1 and L>1. The Q reference signal sequences may be used for Q cell identities (IDs), one reference signal sequence for each cell ID. In one design, a Node B may determine first and second indices based on a cell ID of a cell. The Node B may generate a pseudo-random sequence based on the first index, generate a scrambling sequence based on the second index, and generate a reference signal sequence based on the pseudo-random sequence and the scrambling sequence. The Node B may then generate a reference signal for the cell based on the reference signal sequence, e.g., by generating an OFDM symbol with the reference signal sequence mapped to a set of subcarriers.

29 Claims, 10 Drawing Sheets

U.S. PATENT DOCUMENTS

| | | | |
|---|---|---|---|
| 2007/0253465 A1* | 11/2007 | Muharemovic et al. | 375/130 |
| 2008/0101511 A1* | 5/2008 | Lindoff et al. | 375/347 |
| 2008/0165969 A1* | 7/2008 | Khandekar et al. | 380/270 |
| 2008/0181194 A1* | 7/2008 | Lindoff et al. | 370/350 |

FOREIGN PATENT DOCUMENTS

| KR | 20060002690 A | 1/2006 |
|---|---|---|
| WO | 07066982 | 6/2007 |

OTHER PUBLICATIONS

Taiwan Search Report—TW097131064—TIPO—Jan. 12, 2012.

Ericsson, "Downlink reference-signals [online]", 2006, 3GPP TSG-RAN WG1#46b R1-062966, <URL:http://www.3gpp.org/ftp/tsg_ran/WG1_RL1/TSGR1_46bis/Docs/R1-062966.zip>.

* cited by examiner

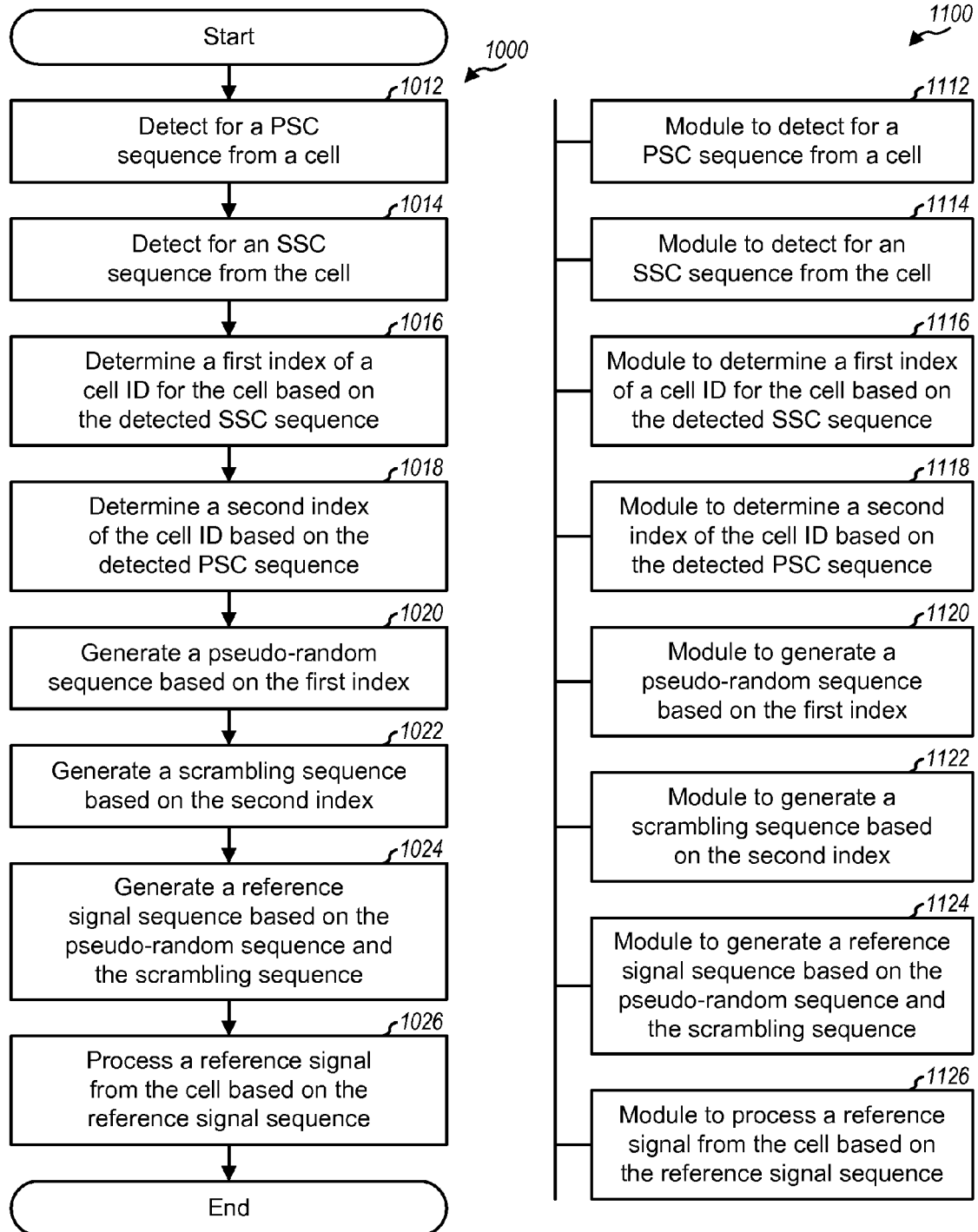

REFERENCE SIGNAL GENERATION IN A WIRELESS COMMUNICATION SYSTEM

The present application claims priority to provisional U.S. application Ser. No. 60/955,801, entitled "METHOD AND APPARATUS FOR REFERENCE SIGNAL GENERATION FOR E-UTRAN," filed Aug. 14, 2007, assigned to the assignee hereof and incorporated herein by reference.

BACKGROUND

I. Field

The present disclosure relates generally to communication, and more specifically to techniques for generating reference signals in a wireless communication system.

II. Background

Wireless communication systems are widely deployed to provide various communication content such as voice, video, packet data, messaging, broadcast, etc. These wireless systems may be multiple-access systems capable of supporting multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

A wireless communication system may include any number of Node Bs that can support communication for any number of user equipments (UEs). Each Node B may support one or more cells and may periodically transmit a reference signal for each cell. A reference signal may also be referred to as pilot. The reference signals from the cells may be used by the UEs for various purposes such as channel estimation, signal strength measurement, signal quality measurement, etc. It is desirable to generate the reference signals in a manner to provide good performance and to simplify processing of the reference signals at the Node B and the UEs.

SUMMARY

Techniques for generating reference signals in a wireless communication system are described herein. In an aspect, a set of Q reference signal sequences may be generated based on G pseudo-random sequences and L scrambling sequences, where $Q=G \cdot L$, $G>1$ and $L>1$. Each reference signal sequence may be generated based on a specific pseudo-random sequence and a specific scrambling sequence. The Q reference signal sequences may be used for Q cell identities (IDs), one reference signal sequence for each cell ID.

In one design, a Node B may determine first and second indices based on a cell ID of a cell. The Node B may generate a pseudo-random sequence based on the first index and may generate a scrambling sequence based on the second index. The scrambling sequence may be generated based on a maximum length sequence (M-sequence), Golay complementary sequences, etc. The Node B may generate a reference signal sequence based on the pseudo-random sequence and the scrambling sequence, e.g., by multiplying the pseudo-random sequence symbol by symbol with the scrambling sequence. The Node B may then generate a reference signal for the cell based on the reference signal sequence, e.g., by mapping the reference signal sequence to a set of subcarriers and generating an OFDM symbol with the reference signal sequence mapped to the set of subcarriers.

In one design, a UE may determine first and second indices based on a cell ID of a cell detected by the UE. The UE may generate a pseudo-random sequence based on the first index, generate a scrambling sequence based on the second index, and generate a reference signal sequence based on the pseudo-random sequence and the scrambling sequence. The UE may process a reference signal received from the cell based on the reference signal sequence. The UE may perform channel estimation, signal strength measurement, signal quality measurement, time tracking, frequency tracking, noise estimation, and/or other functions based on the reference signal from the cell.

Various aspects and features of the disclosure are described in further detail below.

BRIEF DESCRIPTION OF THE DRAWINGS

FIG. 10 shows a process for receiving synchronization and reference signals.

FIG. 11 shows an apparatus for receiving synchronization and reference signals.

DETAILED DESCRIPTION

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). cdma2000 and UMB are described in documents from an organization named "3rd Generation Partnership Project 2" (3GPP2). For clarity, certain aspects of the techniques are described below for LTE, and LTE terminology is used in much of the description below.

Figure 1:
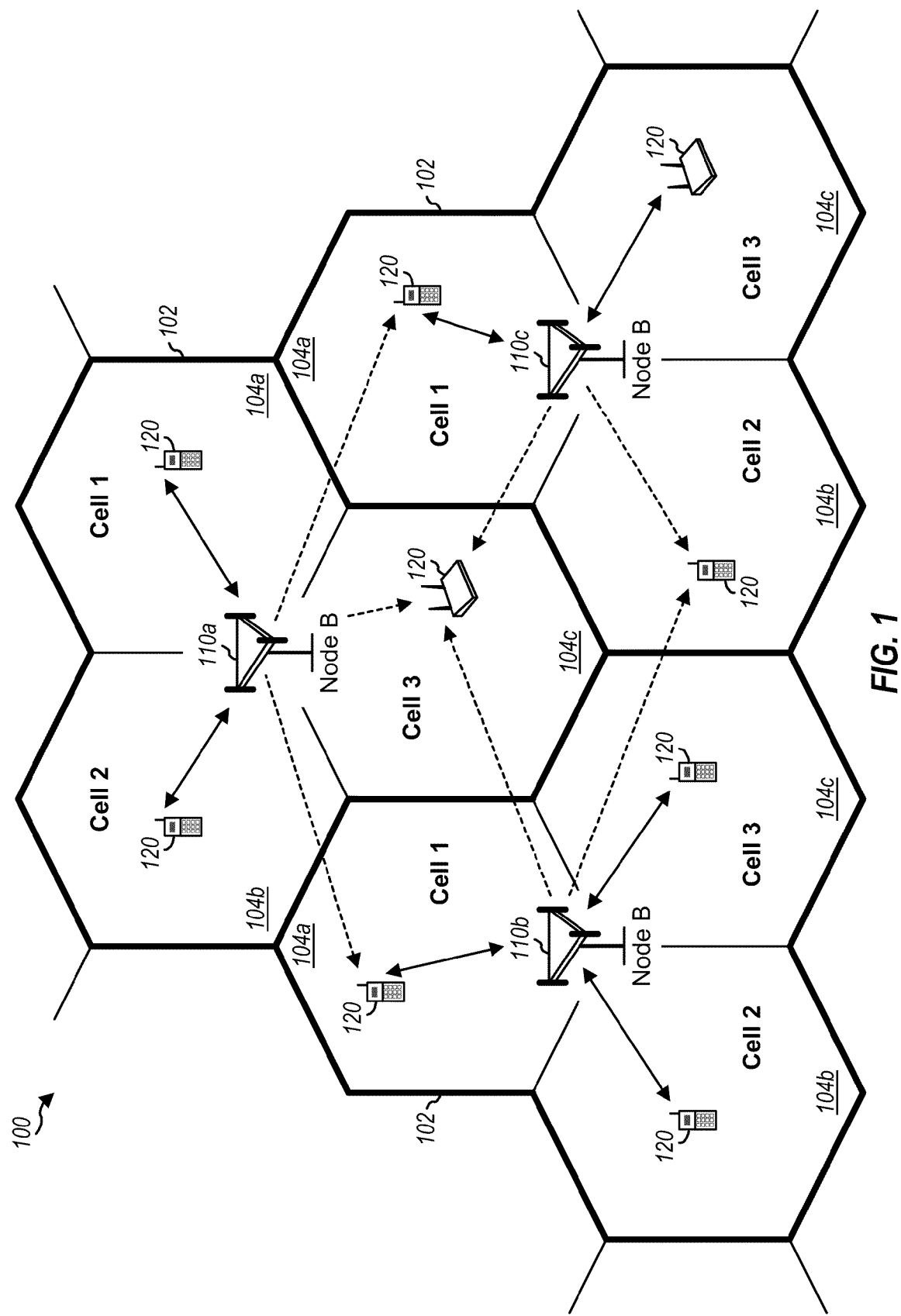
FIG. 1 shows a wireless communication system.

FIG. 1 shows a wireless communication system 100, which may be an LTE system. System 100 may include any number of Node Bs and other network entities. For simplicity, only three Node Bs 111a, 110b and 110c are shown in FIG. 1. A Node B may be a fixed station that communicates with the UEs and may also be referred to as an evolved Node B (eNB), a base station, an access point, etc. Each Node B 110 provides communication coverage for a particular geographic area 102. To improve system capacity, the overall coverage area of a Node B may be partitioned into multiple smaller areas, e.g., three smaller areas 104a, 104b and 104c. Each smaller area may be served by a respective Node B subsystem. In 3GPP, the term "cell" can refer to the smallest coverage area of a Node B and/or a Node B subsystem serving this coverage area. In other systems, the term "sector" can refer to the smallest coverage area of a base station and/or a base station subsystem serving this coverage area. For clarity, 3GPP concept of cell is used in the description below.

In the example shown in FIG. 1, each Node B 110 has three cells 1, 2 and 3 that cover different geographic areas. The cells of Node Bs 110a, 110b and 110c may operate on the same frequency or different frequencies. For clarity, FIG. 1 shows the cells not overlapping one another. In a practical deployment, adjacent cells typically overlap one another at the edges. This overlapping of coverage edges may ensure that a UE can be within the coverage of one or more cells at any location as the UE moves about the system.

UEs 120 may be dispersed throughout the system, and each UE may be stationary or mobile. A UE may also be referred to as a mobile station, a terminal, an access terminal, a subscriber unit, a station, etc. A UE may be a cellular phone, a personal digital assistant (PDA), a wireless modem, a wireless communication device, a handheld device, a laptop computer, a cordless phone, etc. A UE may communicate with a Node B via transmissions on the downlink and uplink. The downlink (or forward link) refers to the communication link from the Node B to the UE, and the uplink (or reverse link) refers to the communication link from the UE to the Node B. In FIG. 1, a solid line with double arrows indicates communication between a Node B and a UE. A broken line with a single arrow indicates a UE receiving downlink signals from a Node B. A UE may perform cell search and other functions based on the downlink signals transmitted by the Node Bs.

In system 100, each Node B may periodically transmit a primary synchronization signal and a secondary synchronization signal for each cell in that Node B. The UEs may search for the primary and secondary synchronization signals to detect for cells and to obtain information such as cell ID, timing, and frequency offset of detected cells. Each Node B may also periodically transmit a reference signal for each cell in that Node B. The UEs may use the reference signals from the detected cells for various functions such as channel estimation, signal strength measurement, signal quality measurement, etc.

Figure 2:
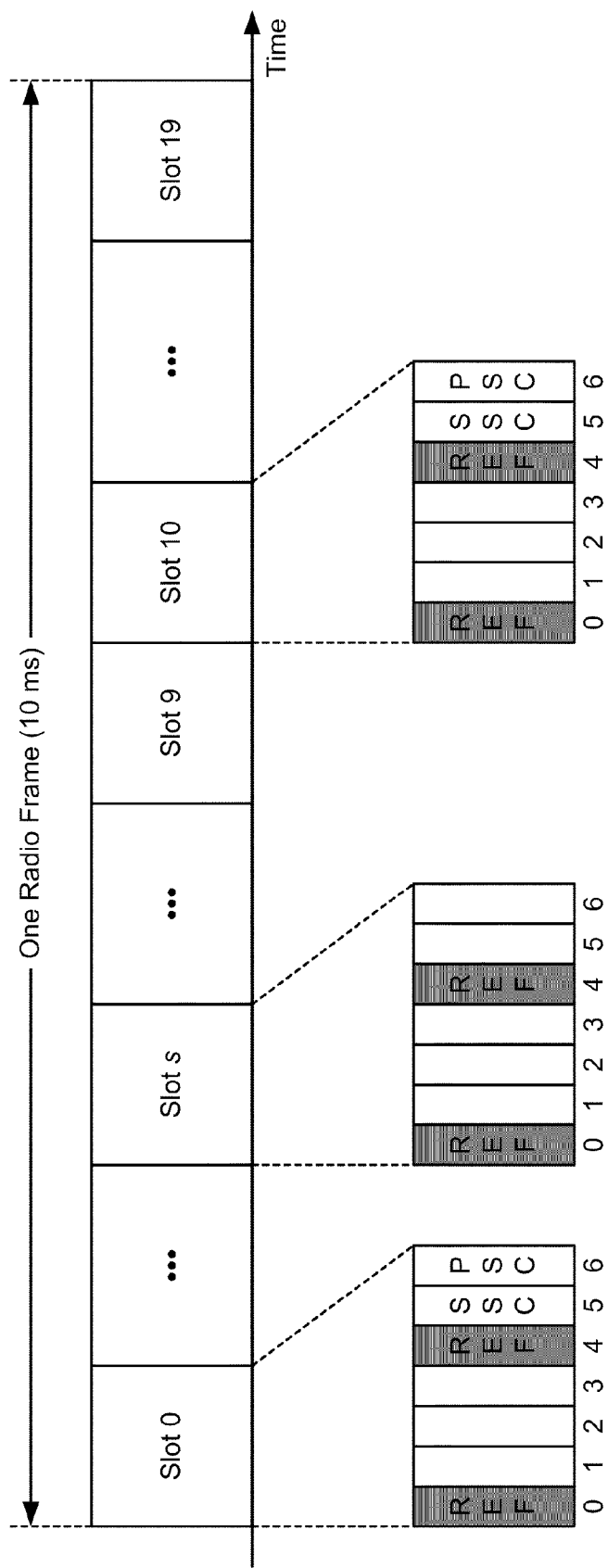
FIG. 2 shows example transmissions of synchronization and reference signals.

FIG. 2 shows example transmissions of the primary and secondary synchronization signals and the reference signal for one cell in accordance with one design. The transmission timeline for the downlink may be partitioned into units of radio frames. Each radio frame may have a predetermined duration (e.g., 10 milliseconds (ms)) and may be partitioned into 20 slots with indices of 0 through 19. Each slot may cover a fixed or configurable number of symbol periods, e.g., six symbol periods for an extended cyclic prefix or seven symbol periods for a normal cyclic prefix.

In the design shown in FIG. 2, each slot includes seven symbol periods with indices of 0 through 6. The primary and secondary synchronization signals may be sent in symbol periods 6 and 5, respectively, of each of slots 0 and 10 of each radio frame. The reference signal may be sent in symbol periods 0 and 4 of each slot of each radio frame.

In general, the primary and secondary synchronization signals and the reference signal may each be sent at any rate, e.g., any number of times in each radio frame. The primary and secondary synchronization signals may be sent in any two symbol periods of a slot. The secondary synchronization signal may be sent near (e.g., either immediately before or after) the primary synchronization signal, so that a channel estimate may be derived from the primary synchronization signal and used for coherent detection of the secondary synchronization signal. The reference signal may be sent in any number of symbol periods and in any symbol period of each slot. The reference signal may be spaced as evenly as possible across the symbol periods of each slot.

Each cell may be assigned a cell ID that is unique among all cells within a certain range of that cell. This cell ID assignment would allow each UE to uniquely identify all cells detected by that UE regardless of the UE location. The system may support a set of Q cell IDs, where Q may be any integer value. Each cell may then be assigned a specific cell ID from the supported set of cell IDs.

In one design, a set of Q=504 unique cell IDs is supported by the system. The 504 cell IDs are grouped into 168 unique cell ID groups, and each cell ID group contains three unique cell IDs. The grouping is such that each cell ID is included in only one cell ID group.

In one design, a cell ID may be expressed as:

$$C_{ID}=3 \cdot g+l, \quad \text{Eq (1)}$$

where
$C_{ID} \in \{0, \ldots, 503\}$ is the cell ID,
$g \in \{0, \ldots, 167\}$ is an index of a cell ID group to which the cell ID belongs, and
$l \in \{0, 1, 2\}$ is an index of a specific ID within the cell ID group.

In the design shown in equation (1), a cell ID is uniquely defined by (i) a first number or index within a range of 0 to 167 and representing the cell ID group and (ii) a second number or index within a range of 0 to 2 and representing an ID within the cell ID group.

In general, any number of cell IDs (Q) may be supported, the cell IDs may be grouped into any number of groups (G), and each group may include any number of cell IDs (L). For clarity, much of the description below is for the design described above with Q=504 total cell IDs, G=168 cell ID groups, and L=3 cell IDs in each group.

Three primary synchronization code (PSC) sequences may be defined for the three possible values of index l for the three cell IDs in each group. In addition, 168 secondary synchronization code (SSC) sequences may be defined for the 168 possible values of index g for the 168 possible cell ID groups. The PSC and SSC sequences may be denoted as:

$d_{psc,l}(n)$ is a PSC sequence for index l, where $l \in \{0, 1, 2\}$, and $d_{ssc,g}(n)$ is an SSC sequence for index g, where $g \in \{0, \ldots, 167\}$, where $n \in \{0, \ldots, 61\}$ is a symbol index for the PSC and SSC sequences. Index g is also referred to as an SSC index, and index l is also referred to as a PSC index.

The PSC sequences may be generated based on a Zadoff-Chu sequence. The SSC sequences may be generated based on one or more M-sequences. The PSC and SSC sequences may be generated as described in 3GPP TS 36.211, entitled "Evolved Universal Terrestrial Radio Access (E-UTRA); Physical Channels and Modulation (Release 8)," which is publicly available.

In an aspect, Q reference signal sequences may be generated based on G pseudo-random sequences and L scrambling sequences, where Q=G·L. Each reference signal sequence may be generated based on a specific pseudo-random sequence and a specific scrambling sequence. The Q reference signal sequences may be used for the Q cell IDs, one reference signal sequence for each cell ID. Each cell may generate a reference signal based on the reference signal sequence for its cell ID.

In one design, the pseudo-random sequences, the scrambling sequences, and the reference signal sequences may be denoted as:

$p_g(n)$ is a pseudo-random sequence for SSC index g, where $g \in \{0, \ldots, 167\}$, $s_l(n)$ is a scrambling sequence for PSC index l, where $l \in \{0, 1, 2\}$, and $r_{g,l}(n)$ is a reference signal sequence for PSC index l and SSC index g, where $n \in \{0, \ldots, N-1\}$ is a symbol index. N may be equal to 220 or some other value.

In the design described above, index g for the cell ID group is used for index g for the pseudo-random sequence. The pseudo-random sequence is thus linked to the SSC sequence. Index l for an ID within a cell ID group is used for index l for the scrambling sequence. The scrambling sequence is thus linked to the PSC sequence. Each cell ID is mapped to one specific PSC sequence $d_{psc,l}(n)$, one specific SSC sequence $d_{ssc,g}(n)$, one specific pseudo-random sequence $p_g(n)$, one specific scrambling sequence $s_l(n)$, and one specific reference signal sequence $r_{g,l}(n)$.

The pseudo-random sequences may be generated in various manners. In one design, the G pseudo-random sequences may be generated based on an M-sequence. In another design, the pseudo-random sequences may be generated based on a Gold sequence c(n), which may be expressed as:

$$c(n) = [x_1(n) + x_2(n)] \bmod 2, \qquad \text{Eq (2)}$$

where $x_1(n+31) = [x_1(n+3) + x_1(n)] \bmod 2$, $x_2(n+31) = [x_2(n+3) + x_2(n+2) + x_2(n+1) + x_2(n)] \bmod 2$, and "mod" denotes a modulo operation.

In equation (2), $x_1(n)$ is a first M-sequence generated based on a first generator polynomial, and $x_2(n)$ is a second M-sequence generated based on a second generator polynomial. Each M-sequence may be generated with a linear feedback shift register (LFSR) that implements the generator polynomial for that M-sequence. Each LFSR may be initialized to a suitable initial value. The first and second M-sequences and the Gold sequence have lengths of $2^{31}-1$. The Gold sequence c(n) has a value of either 0 or 1 for each value of n.

The G pseudo-random sequences may be generated based on the Gold sequence, as follows:

$$p_g(n) = \frac{1}{\sqrt{2}} \cdot [1 - 2 \cdot c(2n)] + j \frac{1}{\sqrt{2}} [1 - 2 \cdot c(2n+1)]. \qquad \text{Eq (3)}$$

In equation (3), the pseudo-random sequence $p_g(n)$ is composed of complex-valued symbols, with each complex-valued symbol being defined by two consecutive symbols of the Gold sequence. The Gold sequence may be generated based on an initial value of $C_{init}$, which may be determined based on the SSC index g. Different pseudo-random sequences may be generated with different initial values for the Gold sequence. The initial value $C_{init}$ may be used to initialize the LFSR for the first M-sequence $x_1(n)$ and/or the LFSR for the second M-sequence $X_2(n)$.

In one design, a cell may use the same pseudo-random sequence for each symbol period in which the reference signal is transmitted. In this design, the initial value $C_{init}$ may be a function of SSC index g, or $C_{init} = f(g)$, where $f(\,)$ may be any suitable function. In another design, the cell may use different pseudo-random sequences for different symbol periods of each slot or each subframe of two slots. In this design, the initial value $C_{init}$ may be a function of SSC index g as well as symbol period index t, or $C_{init} = f(g,t)$. In yet another design, the cell may use different pseudo-random sequences for different slots or subframes. In this design, the initial value $C_{init}$ may be a function of SSC index g as well as slot or subframe index s, or $c_{init} = f(g,s)$. In yet another design, the cell may use different pseudo-random sequences for different symbol periods in different slots or subframes. In this design, the initial value $c_{init}$ may be a function of SSC index g as well as symbol period index t and slot or subframe index s, or $c_{init} = f(g,t,s)$. In general, the pseudo-random sequence (i) may be static and used for all symbol periods in which the reference signal is transmitted or (ii) may change for different symbol periods, different slots, different subframes, etc.

The L scrambling sequences may be generated in various manners. In one design, the scrambling sequences may be generated based on L M-sequences, with each scrambling sequence being generated based on a different M-sequence. In another design, the scrambling sequences may be generated based on different cyclic shifts of a single M-sequence. In yet another design, the scrambling sequences may be generated based on Golay complementary sequences. A direct construction method for generating different pairs of Golay complementary sequences of any length N is described by Marcel J. E. Golay in a paper entitled "Complementary Series," IRE Trans. Inform. Theory, IT-7:82-87, 1961. N different pairs of Golay complementary sequences of length N may also be obtained by multiplying a pair of Golay complementary sequences of length N with an N×N Hadamard matrix. The scrambling sequences may also be generated in other manners, e.g., with other types of sequences having good correlation properties.

In one design, the scrambling sequences have the same length N as the pseudo-random sequences. In another design, shorter scrambling sequences of length S may be extended by repeating as many times as needed to obtain scrambling sequences of length N. A shorter scrambling sequence may be extended as follows:

$$s_l(n + i \cdot S) = s_l'(n), \text{ for } i = 0, 1, \ldots, \qquad \text{Eq (4)}$$

where $s_l'(n)$ is a shorter scrambling sequence for PSC index l.

In one design, a reference signal sequence may be generated based on a pseudo-random sequence and a scrambling sequence, as follows:

$$r_{g,l}(n) = p_g(n) \cdot s_l(n), \text{ for } l \in \{0, 1, 2\} \text{ and } g \in \{0, \ldots, 167\}. \qquad \text{Eq (5)}$$

LTE utilizes orthogonal frequency division multiplexing (OFDM) on the downlink. OFDM partitions the system bandwidth into multiple (K) orthogonal subcarriers, which are also commonly referred to as tones, bins, etc. The spacing between adjacent subcarriers may be fixed, and the total number of subcarriers (K) may be dependent on the system bandwidth. Each subcarrier may be modulated with data.

To generate an OFDM symbol, real and/or complex-valued symbols may be mapped to subcarriers used for transmission, and zero symbols with signal values of zero may be mapped to subcarriers not used for transmission. K total symbols for K total subcarriers may be transformed with a K-point inverse fast Fourier transform (IFFT) to obtain a useful portion containing K time-domain samples. The last C samples of the useful portion may be copied and appended to the front of the useful portion to form an OFDM symbol containing K+C samples. The copied portion is referred to as a cyclic prefix and is used to combat inter-symbol interference (ISI) caused by frequency selective fading. LTE supports a normal cyclic prefix with a nominal value of C and an extended cyclic prefix with a larger value of C. A slot may include seven symbol periods for the normal cyclic prefix or six symbol periods for the extended cyclic prefix.

Figure 3:
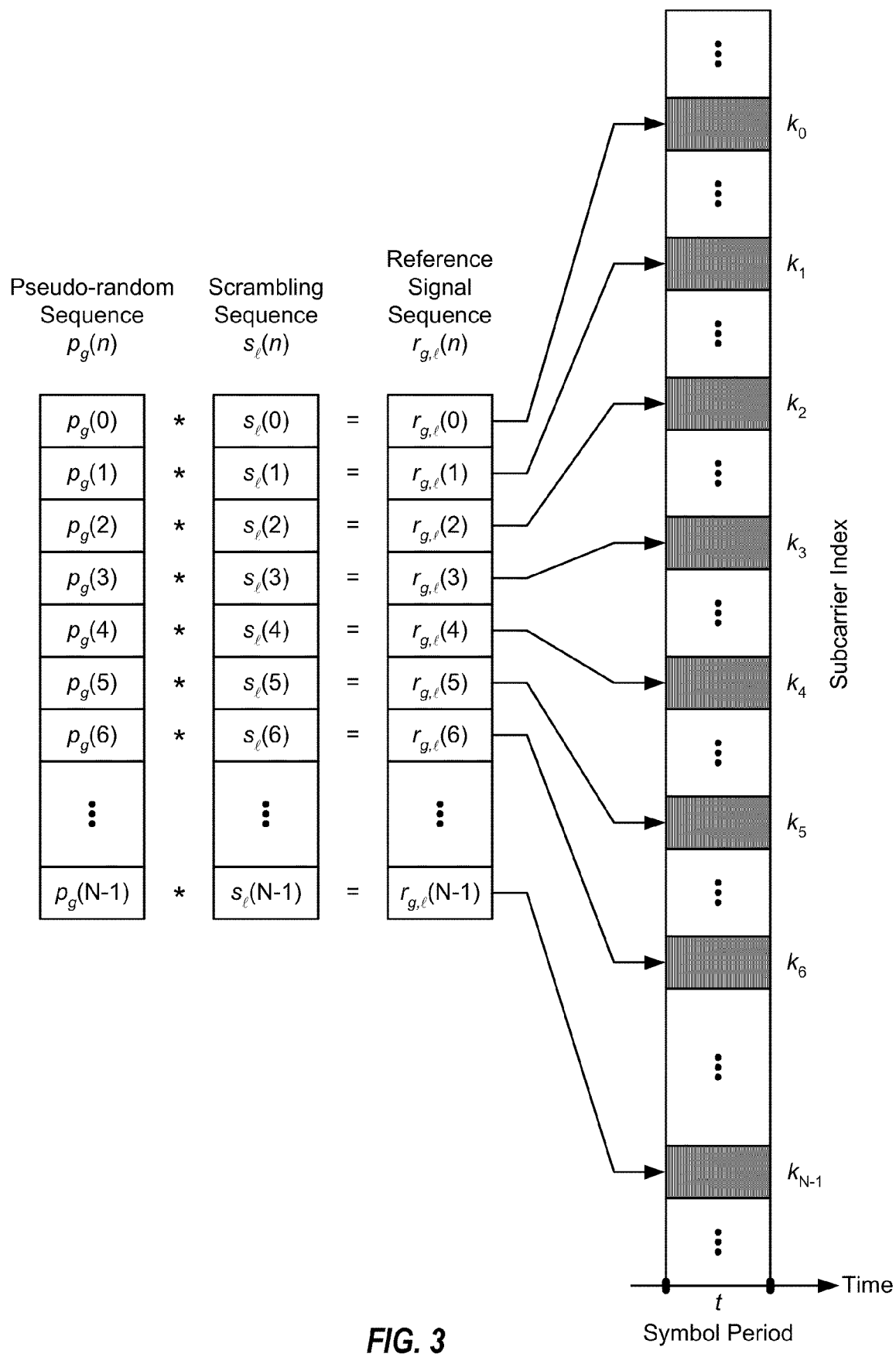
FIG. 3 shows a design of generating a reference signal sequence.

FIG. 3 shows a design of generating a reference signal for a cell. A pseudo-random sequence $p_g(n)$ may be multiplied symbol by symbol with a scrambling sequence $s_l(n)$ to generate a reference signal sequence $r_{g,l}(n)$, as shown in equation (5). The N symbols of the reference signal sequence may be mapped to a set of N subcarriers with indices $k_0$ through $k_{N-1}$ used for transmitting the reference signal. The subcarriers used for the reference signal may be spaced apart by a predetermined number of subcarriers, e.g., by six subcarriers. The subcarriers not used for the reference signal may be used to send data and/or other information.

Figures 4A, 4B:
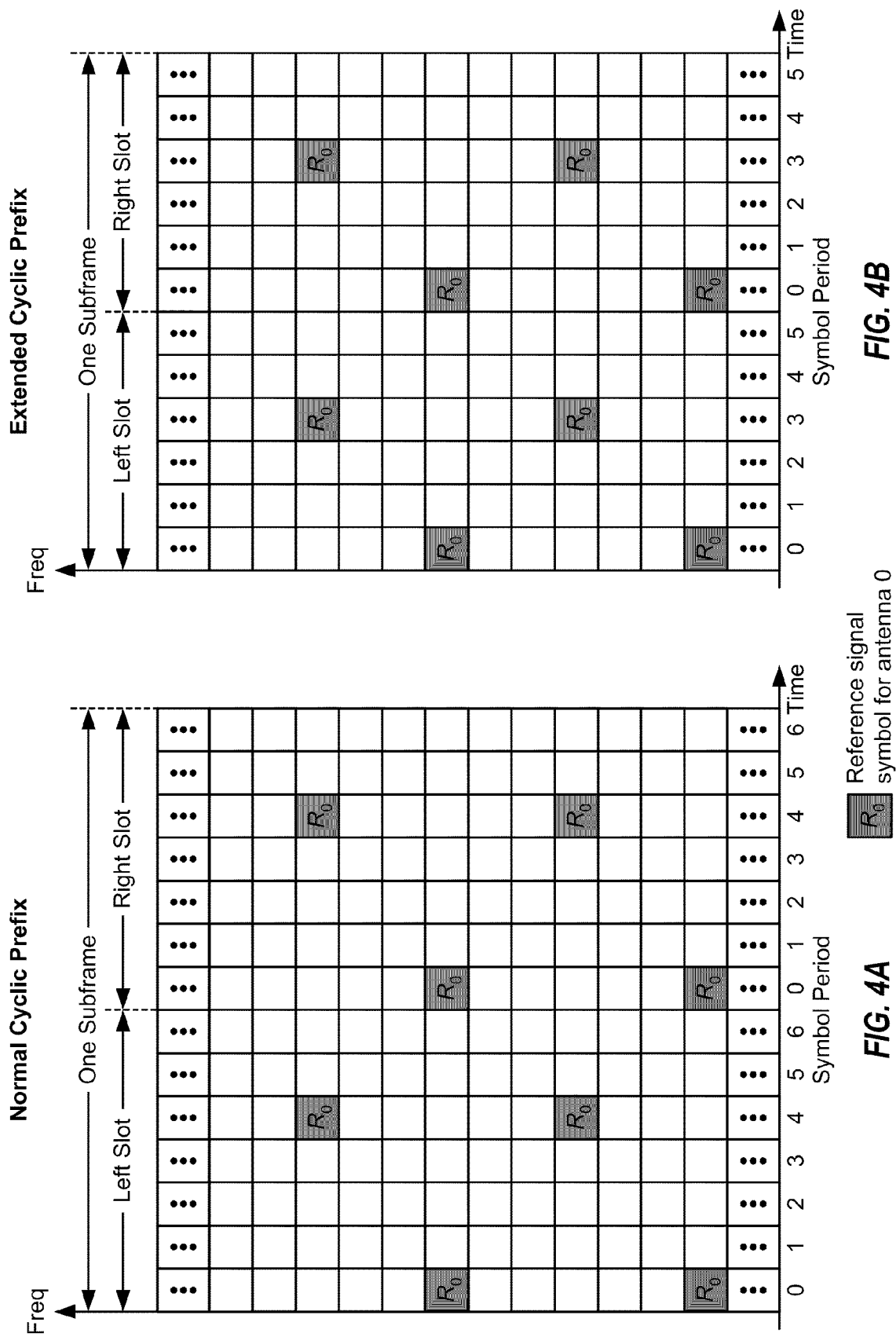
FIG. 4A shows reference signal transmission for a normal cyclic prefix.
FIG. 4B shows reference signal transmission for an extended cyclic prefix.

FIG. 4A shows a design of transmitting a reference signal from one antenna of one cell with the normal cyclic prefix. In this design, each slot includes seven symbol periods 0 through 6, and the reference signal is transmitted in symbol periods 0 and 4 of each slot. The reference signal is sent on a first set of subcarriers that are spaced apart by six subcarriers in symbol period 0. The reference signal is sent on a second set of subcarriers that are also spaced apart by six subcarriers in symbol period 4. The subcarriers in the second set are offset from the subcarriers in the first set by three subcarriers.

FIG. 4B shows a design of transmitting a reference signal from one antenna of one cell with the extended cyclic prefix. In this design, each slot includes six symbol periods 0 through 5, and the reference signal is transmitted in symbol periods 0 and 3 of each slot. The reference signal is sent on the first set of subcarriers in symbol period 0 and on the second set of subcarriers in symbol period 3.

Figure 4C:
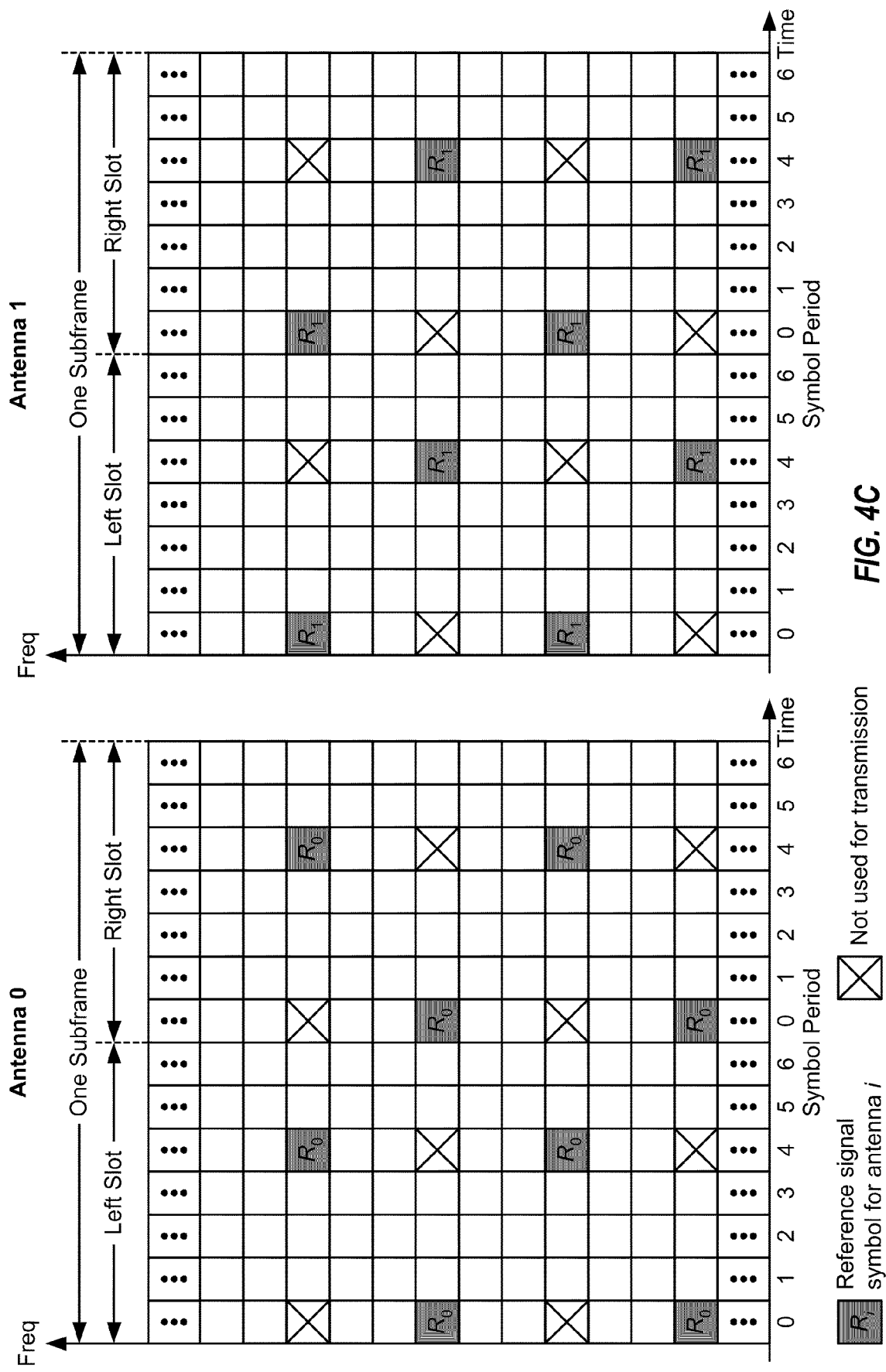
FIG. 4C shows reference signal transmission from two antennas.

FIG. 4C shows a design of transmitting a reference signal from two antennas of one cell with the normal cyclic prefix. In this design, for antenna 0, the reference signal is transmitted on the first set of subcarriers in symbol period 0 and on the second set of subcarriers in symbol period 4 of each slot. For antenna 1, the reference signal is transmitted on the second set of subcarriers in symbol period 0 and on the first set of subcarriers in symbol period 4 of each slot. The subcarriers used for transmission of the reference signal by one antenna is not used for transmission by the other antenna.

In general, the reference signal may be transmitted from any number of antennas. The reference signal may be transmitted on a set of subcarriers in one symbol period from one antenna, and no signal may be sent on this set of subcarriers from other antennas in order to avoid interference to the reference signal.

Figure 5:
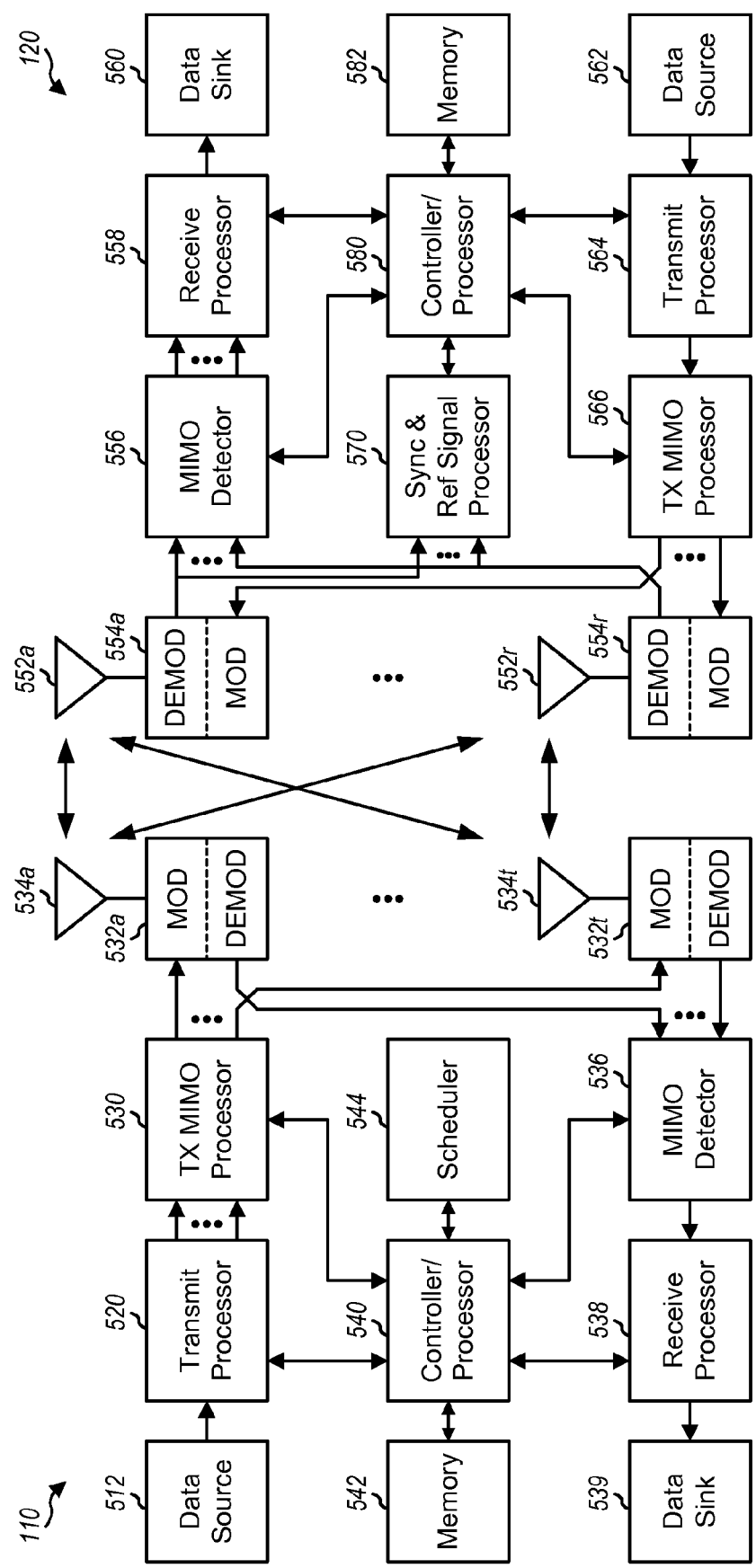
FIG. 5 shows a block diagram of a Node B and a UE.

FIG. 5 shows a block diagram of a design of a Node B 110 and a UE 120, which are one of the Node Bs and one of the UEs in FIG. 1. In this design, Node B 110 is equipped with T antennas 534a through 534t, and UE 120 is equipped with R antennas 552a through 552r, where in general T≧1 and R≧1.

At Node B 110, a transmit processor 520 may receive data for one or more UEs from a data source 512, process the data for each UE based on one or more modulation and coding schemes selected for that UE, and provide data symbols for all UEs. Transmit processor 520 may also generate the primary and secondary synchronization signals and the reference signal for each cell and may provide symbols for the primary and secondary synchronization signals and the reference signals for all cells in Node B 110. A transmit (TX) multiple-input multiple-output (MIMO) processor 530 may multiplex the data symbols, pilot symbols, and symbols for the synchronization and reference signals. TX MIMO processor 530 may perform spatial processing (e.g., precoding) on the multiplexed symbols, if applicable, and provide T output symbol streams to T modulators (MODs) 532a through 532t. Each modulator 532 may process a respective output symbol stream (e.g., for OFDM) to obtain an output sample stream. Each modulator 532 may further process (e.g., convert to analog, amplify, filter, and upconvert) the output sample stream to obtain a downlink signal. T downlink signals from modulators 532a through 532t may be transmitted via T antennas 534a through 534t, respectively.

At UE 120, antennas 552a through 552r may receive the downlink signals from Node B 110 and provide received signals to demodulators (DEMODs) 554a through 554r, respectively. Each demodulator 554 may condition (e.g., filter, amplify, downconvert, and digitize) a respective received signal to obtain input samples and may further process the input samples (e.g., for OFDM) to obtain received symbols. A MIMO detector 556 may obtain received symbols from all R demodulators 554a through 554r, perform MIMO detection on the received symbols if applicable, and provide detected symbols. A receive processor 558 may process (e.g., demodulate, deinterleave, and decode) the detected symbols and provide decoded data for UE 120 to a data sink 560. In general, the processing by MIMO detector 556 and receive processor 558 is complementary to the processing by TX MIMO processor 530 and transmit processor 520 at Node B 110.

On the uplink, at UE 120, data from a data source 562 and signaling from a controller/processor 580 may be processed by a transmit processor 564, further processed by a TX MIMO processor 566 if applicable, conditioned by modulators 554a through 554r, and transmitted to Node B 110. At Node B 110, the uplink signals from UE 120 may be received by antennas 534, conditioned by demodulators 532, processed by a MIMO detector 536 if applicable, and further processed by a receive processor 538 to obtain the data and signaling transmitted by UE 120.

Controllers/processors 540 and 580 may direct the operation at Node B 110 and UE 120, respectively. Memories 542 and 582 may store data and program codes for Node B 110 and UE 120, respectively. A scheduler 544 may schedule UEs for downlink and/or uplink transmission and may provide assignments of resources for the scheduled UEs. A synchronization and reference signal processor 570 at UE 120 may perform processing for the primary and secondary synchronization signals and the reference signals.

Figure 6:
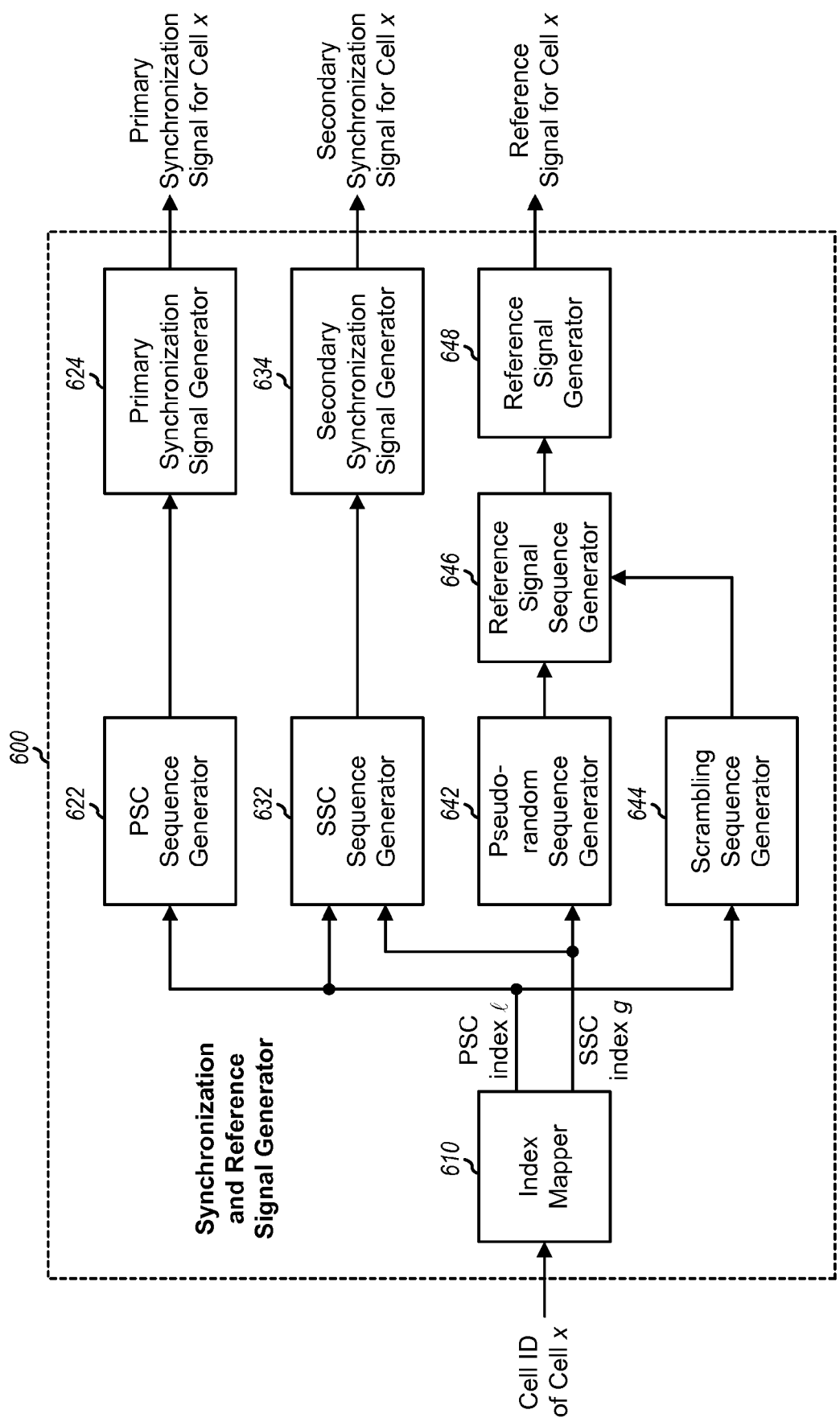
FIG. 6 shows a synchronization and reference signal generator at the Node B.

FIG. 6 shows a block diagram of a design of a synchronization and reference signal generator 600 for Node B 110. Generator 600 may be part of transmit processor 520 and/or modulators 532 in FIG. 5. Generator 600 may receive a cell ID of a cell x and may generate the primary and secondary synchronization signals and the reference signal for cell x.

Within generator 600, an index mapper 610 may receive the cell ID of cell x and provide a PSC index l and an SSC index g for the cell ID, e.g., as shown in equation (1). A generator 622 may generate a PSC sequence for cell x based on PSC index l. A generator 624 may generate a primary synchronization signal for cell x based on the PSC sequence, e.g., by mapping the symbols of the PSC sequence to subcarriers used for the primary synchronization signal and performing OFDM modulation on the mapped symbols.

A generator 632 may generate an SSC sequence for cell x based on SSC index g and PSC index l. A generator 634 may generate a secondary synchronization signal for cell x based on the SSC sequence, e.g., by mapping the symbols of the SSC sequence to subcarriers used for the secondary synchronization signal and performing OFDM modulation on the mapped symbols.

A generator 642 may generate a pseudo-random sequence for cell x based on SSC index g, e.g., as shown in equations (2) and (3). A generator 644 may generate a scrambling sequence for cell x based on PSC index l. A generator 646 may generate a reference signal sequence for cell x based on the pseudo-random sequence and the scrambling sequence, e.g., as shown in equation (5). A generator 648 may generate a reference signal for cell x based on the reference signal sequence, e.g., by mapping the symbols of the reference signal sequence to subcarriers used for the reference signal and performing OFDM modulation on the mapped symbols.

Generator 600 may generate the primary and secondary synchronization signals and the reference signals for all cells in Node B 110. Generator 600 may generate the primary and secondary synchronization signals for each cell based on a different combination of PSC and SSC sequences determined by the cell ID of that cell. Generator 600 may also generate the reference signal for each cell based on a different combination of pseudo-random sequence and scrambling sequence determined by the cell ID of that cell.

Figure 7:
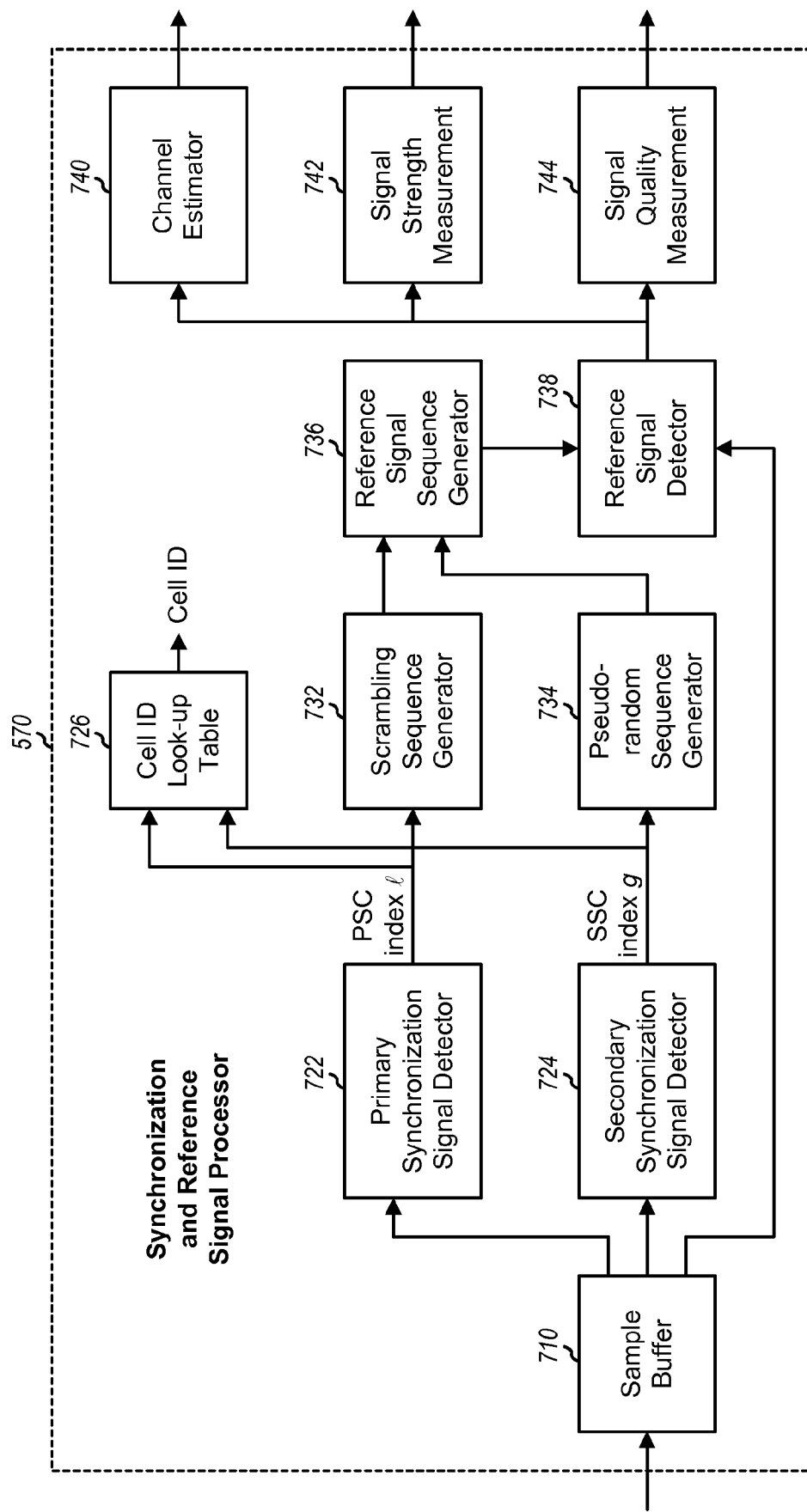
FIG. 7 shows a synchronization and reference signal processor at the UE.

FIG. 7 shows a block diagram of a design of synchronization and reference signal processor 570 at UE 120 in FIG. 5. In this design, processor 570 includes a sample buffer 710, a synchronization signal processor composed of blocks 722, 724 and 726, and a reference signal processor composed of blocks 732 to 744. Sample buffer 710 may receive and store input samples and may provide appropriate input samples when requested.

The synchronization signal processor may detect for primary and secondary synchronization signals to search for cells. Within the synchronization signal processor, a detector 722 may detect for a primary synchronization signal in each timing hypothesis, e.g., each sample period. Detector 722 may correlate the input samples with different possible PSC sequences to obtain correlation results for each timing hypothesis. Detector 722 may then determine whether or not a primary synchronization signal is detected based on the correlation results. If a primary synchronization signal is detected, then detector 722 may provide the detected PSC sequence, symbol timing, and information (e.g., PSC index l) sent in the primary synchronization signal.

A detector 724 may detect for a secondary synchronization signal whenever a primary synchronization signal is detected. Detector 724 may remove frequency offset from the input samples, transform the frequency-corrected samples to the frequency domain, and perform coherent detection on the frequency-domain symbols with channel gains derived from the detected primary synchronization signal to obtain input symbols. Detector 724 may then correlate the input symbols with different possible SSC sequences to obtain correlation results and may determine whether or not a secondary synchronization signal is detected based on the correlation results. If a secondary synchronization signal is detected, then detector 724 may provide the detected SSC sequence, frame timing, and information (e.g., SSC index g) sent in the secondary synchronization signal. A look-up table 726 may receive the detected PSC index l and SSC index g and provide the cell ID of a detected cell.

The reference signal processor may perform processing for the reference signal from each detected cell. Within the reference signal processor, a generator 732 may generate a scrambling sequence for a detected cell based on PSC index l for that cell. A generator 734 may generate a pseudo-random sequence for the detected cell based on SSC index g for the cell. A generator 736 may generate a reference signal sequence for the detected cell based on the pseudo-random sequence and the scrambling sequence. A detector 738 may remove frequency offset from the input samples and transform the frequency-corrected samples to the frequency domain to obtain received symbols. Detector 738 may multiply the received symbols with symbols of the reference signal sequence to obtain detected symbols for all subcarriers used to send the reference signal.

A channel estimator 740 may derive a channel estimate for the detected cell based on the detected symbols. In one design, channel estimator 740 may transform the detected symbols to the time domain to obtain channel taps, perform thresholding and set low energy channel taps to zero, perform truncation, and transform the resultant channel taps to the frequency domain to obtain channel gains for subcarriers of interest. Channel estimator 740 may also perform channel estimation in other manners. The channel estimate may be used by MIMO detector 556 in FIG. 5 for spatial processing and/or by other units at UE 120 for coherent detection.

A signal strength measurement unit 742 may measure the signal strength of the detected cell based on the detected symbols, e.g., by accumulating the powers of the detected symbols. The signal strength measurements may be used to select a suitable cell for communication, to make handover decisions, etc. A signal quality measurement unit 744 may measure the received signal quality of the detected cell based on the detected symbols, e.g., by dividing the power of the detected symbols by estimated interference and noise power. Unit 744 may also derive channel quality indicator (CQI) information for the detected cell based on the received signal quality. The CQI information may be sent to the Node B, which may select a suitable modulation and coding scheme for data transmission to UE 120 based on the CQI information. Although not shown in FIG. 7, the detected symbols for the reference signal may also be used for other purposes such as noise estimation, time tracking, frequency tracking, etc.

The reference signal processor may process the reference signal from each detected cell of interest. The reference signal processor may periodically process the reference signal from each detected cell whenever the reference signal is received from that cell.

Figure 8:
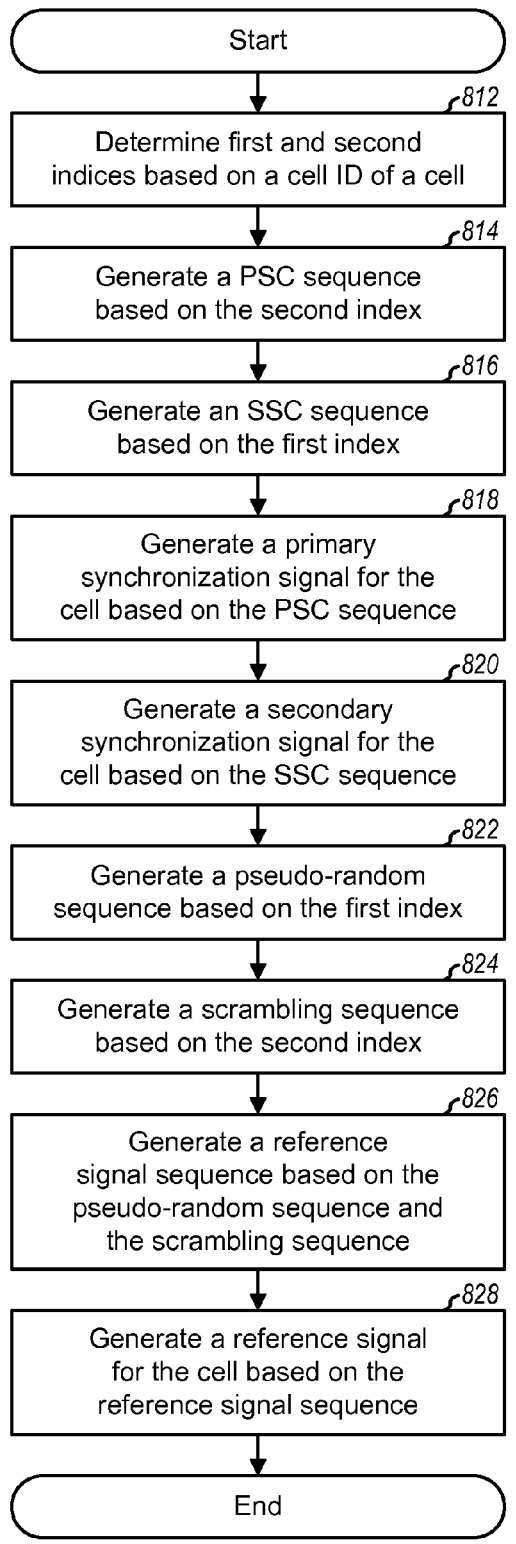
FIG. 8 shows a process for generating synchronization and reference signals.

FIG. 8 shows a design of a process 800 for generating synchronization and reference signals in a wireless communication system. Process 800 may be performed by a Node B for a cell (as described below) or by some other entity.

The Node B may determine first and second indices based on a cell ID of a cell (block 812). The first index may be an SSC index g, and the second index may be a PSC index l. The Node B may generate a PSC sequence based on the second index (block 814) and may generate an SSC sequence based on the first index (block 816). The Node B may generate a primary synchronization signal for the cell based on the PSC sequence (block 818) and may generate a secondary synchronization signal for the cell based on the SSC sequence (block 820).

The Node B may generate a pseudo-random sequence based on the first index (block 822). The pseudo-random sequence may be one of G possible pseudo-random sequences for G possible values of the first index. The pseudo-random sequence may be fixed or may vary across symbol periods, slots, subframes, etc. The Node B may generate a scrambling sequence based on the second index (block 824). There may be a one-to-one mapping between the PSC sequence and the scrambling sequence, which may be linked by the second index. The scrambling sequence may be one of L possible scrambling sequences for L possible values of the second index. The scrambling sequence may be generated based on an M-sequence, Golay complementary sequences, etc. The scrambling sequence may have the same length as the pseudo-random sequence. Alternatively, a short scrambling sequence may be repeated to obtain the scrambling sequence having the same length as the pseudo-random sequence, e.g., as shown in equation (4). The same pseudo-random sequence and the same scrambling sequence may be used for both the normal cyclic prefix and the extended cyclic prefix.

The Node B may generate a reference signal sequence based on the pseudo-random sequence and the scrambling sequence, e.g., by multiplying the pseudo-random sequence symbol by symbol with the scrambling sequence, as shown in equation (5) (block 826). The Node B may then generate a reference signal for the cell based on the reference signal sequence (block 828). For block 828, the Node B may map the reference signal sequence to a set of subcarriers used for the reference signal. The Node B may then generate an OFDM symbol with the reference signal sequence mapped to the set of subcarriers. The OFDM symbol would comprise the reference signal. The Node B may send the reference signal periodically (e.g., as shown in FIG. 4A, 4B or 4C) for use by the UEs for channel estimation, signal strength measurement, signal quality measurement, time tracking, frequency tracking, noise estimation, etc.

Figure 9:
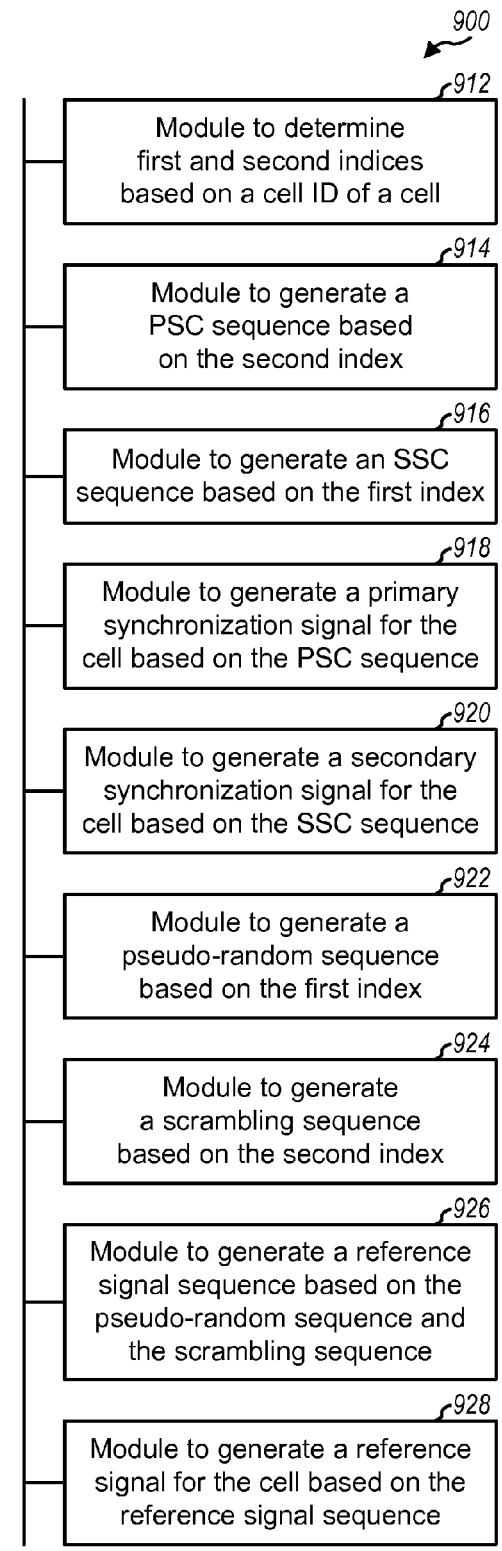
FIG. 9 shows an apparatus for generating synchronization and reference signals.

FIG. 9 shows a design of an apparatus 900 for generating synchronization and reference signals in a wireless communication system. Apparatus 900 includes a module 912 to determine first and second indices based on a cell ID of a cell, a module 914 to generate a PSC sequence based on the second index, a module 916 to generate an SSC sequence based on the first index, a module 918 to generate a primary synchronization signal for the cell based on the PSC sequence, a module 920 to generate a secondary synchronization signal for the cell based on the SSC sequence, a module 922 to generate a pseudo-random sequence based on the first index, a module 924 to generate a scrambling sequence based on the second index, a module 926 to generate a reference signal sequence based on the pseudo-random sequence and the scrambling sequence, and a module 928 to generate a reference signal for the cell based on the reference signal sequence.

FIG. 10 shows a design of a process 1000 for receiving synchronization and reference signals in a wireless communication system. Process 1000 may be performed by a UE (as described below) or by some other entity. The UE may detect for a PSC sequence from a cell (block 1012) and may detect for an SSC sequence from the cell (block 1014). The UE may determine a first index (e.g., SSC index g) of a cell ID for the cell based on the detected SSC sequence (block 1016) and may determine a second index (e.g., PSC index l) of the cell ID based on the detected PSC sequence (block 1018).

The UE may generate a pseudo-random sequence based on the first index (block 1020) and may generate a scrambling sequence based on the second index (block 1022). The UE may generate a reference signal sequence based on the pseudo-random sequence and the scrambling sequence (block 1024). The UE may process a reference signal received from the cell based on the reference signal sequence (block 1026). The UE may derive a channel estimate, measure signal strength, measure signal quality, perform time tracking, perform frequency tracking, and/or perform other functions based on the reference signal from the cell.

FIG. 11 shows a design of an apparatus 1100 for receiving synchronization and reference signals in a wireless communication system. Apparatus 1100 includes a module 1112 to detect for a PSC sequence from a cell, a module 1114 to detect for an SSC sequence from the cell, a module 1116 to determine a first index of a cell ID for the cell based on the detected SSC sequence, a module 1118 to determine a second index of the cell ID based on the detected PSC sequence, a module 1120 to generate a pseudo-random sequence based on the first index, a module 1122 to generate a scrambling sequence based on the second index, a module 1124 to generate a reference signal sequence based on the pseudo-random sequence and the scrambling sequence, and a module 1126 to process a reference signal received from the cell based on the reference signal sequence.

The processing in FIGS. 8 to 11 may be performed implicitly and/or explicitly. For example, since the cell ID of a cell may be fixed, the reference signal sequence for the cell may be pre-computed and stored in memory. The processing in blocks 822, 824 and 826 in FIG. 8 and/or the processing in blocks 1020, 1022 and 1024 in FIG. 10 may be implicitly performed by retrieving the reference signal sequence for the cell from the memory.

The modules in FIGS. 9 and 11 may comprise processors, electronics devices, hardware devices, electronics components, logical circuits, memories, etc., or any combination thereof.

In an alternative design, the reference signal sequences may be generated in different manners for the normal cyclic prefix and the extended cyclic prefix. For the normal cyclic prefix, 504 reference signal sequences may be generated based on 168 pseudo-random sequences of length N and 3 orthogonal sequences of length 3. Each orthogonal sequence may be repeated to obtain an extended orthogonal sequence of length N. For the extended cyclic prefix, 504 reference signal sequences may be generated based on 504 pseudo-random sequences of length N.

The reference signal sequences generated based on the pseudo-random sequences and the scrambling sequences, as described above, may provide certain advantages over the alternative design. First, the scrambling sequences may provide improved performance over the orthogonal sequences for the reference signal sequences. The orthogonal sequences may reduce channel estimation capability for wireless channels with large delay spread whereas the scrambling sequences may avoid this problem. Second, the same set of 168 pseudo-random sequences may be used for both the normal and extended cyclic prefixes. This may simplify UE implementation since (i) there is no need to generate different pseudo-random sequences for the normal and extended cyclic prefixes and (ii) a single receiver structure may be used for channel estimation for both the normal and extended cyclic prefixes. The mapping of cell ID to PSC and SSC indices may also be used for the pseudo-random sequence and the scrambling sequence due to (i) a one-to-one mapping between the L scrambling sequences and the L possible values of the PSC index and (ii) a one-to-one mapping between the G pseudo-random sequences and the G possible values of the SSC index.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of generating a reference signal in a wireless communication system, comprising:
    generating a pseudo-random sequence based on a cell identity (ID) of a cell;
    generating a scrambling sequence based on the cell ID;
    generating a reference signal sequence based on the pseudo-random sequence and the scrambling sequence;
    generating a reference signal for the cell based on the reference signal sequence; and
    determining a first index and a second index based on the cell ID, wherein the generating the pseudo-random sequence includes generating the pseudo-random sequence based on the first index, and wherein the generating the scrambling sequence includes generating the scrambling sequence based on the second index.

2. The method of claim 1, wherein the generating the pseudo-random sequence based on the first index includes generating the pseudo-random sequence as one of G possible pseudo-random sequences for G possible values of the first index, where G is an integer greater than one, and wherein the generating the scrambling sequence based on the second index includes generating the scrambling sequence as one of L possible scrambling sequences for L possible values of the second index, where L is an integer greater than one.

3. The method of claim 1, further comprising:
    generating a primary synchronization code (PSC) sequence based on the second index;
    generating a secondary synchronization code (SSC) sequence based on the first index;
    generating a primary synchronization signal for the cell based on the PSC sequence; and
    generating a secondary synchronization signal for the cell based on the SSC sequence.

4. The method of claim 3, wherein the PSC sequence is mapped one-to-one to the scrambling sequence based on the second index.

5. The method of claim 1, wherein the generating the scrambling sequence includes generating the scrambling sequence based on a maximum length sequence (M-sequence) or Golay complementary sequences.

6. The method of claim 1, wherein the scrambling sequence has same length as the pseudo-random sequence.

7. The method of claim 1, wherein the generating the reference signal sequence includes multiplying the pseudo-random sequence symbol by symbol with the scrambling sequence to obtain the reference signal sequence.

8. The method of claim 1, wherein the generating the reference signal includes, for each symbol period in which the reference signal is sent,
mapping the reference signal sequence to a set of subcarriers used for the reference signal, and
generating an orthogonal frequency division multiplexing (OFDM) symbol with the reference signal sequence mapped to the set of subcarriers, the OFDM symbol including the reference signal.

9. The method of claim 1, further comprising:
sending the reference signal periodically for use by user equipments (UEs) for channel estimation, signal strength measurement, signal quality measurement, time tracking, frequency tracking, noise estimation, or any combination thereof.

10. The method of claim 1, wherein the pseudo-random sequence and the scrambling sequence are used for both normal cyclic prefix and extended cyclic prefix.

11. A method of generating a reference signal in a wireless communication system, comprising:
generating a pseudo-random sequence based on a cell identity (ID) of a cell;
generating a scrambling sequence based on the cell ID;
generating a reference signal sequence based on the pseudo-random sequence and the scrambling sequence; and
generating a reference signal for the cell based on the reference signal sequence; wherein the generating the scrambling sequence includes
generating a first sequence having shorter length than the pseudo-random sequence, and
repeating the first sequence to obtain the scrambling sequence having same length as the pseudo-random sequence.

12. An apparatus for wireless communication, comprising:
at least one processor configured to generate a pseudo-random sequence based on a cell identity (ID) of a cell, to generate a scrambling sequence based on the cell ID, to generate a reference signal sequence based on the pseudo-random sequence and the scrambling sequence, to generate a reference signal for the cell based on the reference signal sequence, to determine a first index and a second index based on the cell ID, wherein the at least one processor is configured to generate the pseudo-random sequence based on the first index, and wherein the at least one processor is configured to generate the scrambling sequence based on the second index.

13. The apparatus of claim 12, wherein the at least one processor is configured to generate a primary synchronization code (PSC) sequence based on the second index, to generate a secondary synchronization code (SSC) sequence based on the first index, to generate a primary synchronization signal for the cell based on the PSC sequence, and to generate a secondary synchronization signal for the cell based on the SSC sequence.

14. The apparatus of claim 12, wherein the at least one processor is configured to generate the scrambling sequence based on a maximum length sequence (M-sequence) or Golay complementary sequences.

15. An apparatus for wireless communication, comprising:
means for generating a pseudo-random sequence based on a cell identity (ID) of a cell;
means for generating a scrambling sequence based on the cell ID;
means for generating a reference signal sequence based on the pseudo-random sequence and the scrambling sequence;
means for generating a reference signal for the cell based on the reference signal sequence; and
means for determining a first index and a second index based on the cell ID, wherein the means for generating the pseudo-random sequence includes means for generating the pseudo-random sequence based on the first index, and wherein the means for generating the scrambling sequence includes means for generating the scrambling sequence based on the second index.

16. The apparatus of claim 15, further comprising:
means for generating a primary synchronization code (PSC) sequence based on the second index;
means for generating a secondary synchronization code (SSC) sequence based on the first index;
means for generating a primary synchronization signal for the cell based on the PSC sequence; and
means for generating a secondary synchronization signal for the cell based on the SSC sequence.

17. The apparatus of claim 15, wherein the means for generating the scrambling sequence includes means for generating the scrambling sequence based on a maximum length sequence (M-sequence) or Golay complementary sequences.

18. A computer program product, comprising:
a non-transitory computer-readable medium having instructions stored thereon, the instructions including:
instructions for causing at least one computer to generate a pseudo-random sequence based on a cell identity (ID) of a cell,
instructions for causing the at least one computer to generate a scrambling sequence based on the cell ID,
instructions for causing the at least one computer to generate a reference signal sequence based on the pseudo-random sequence and the scrambling sequence,
instructions for causing the at least one computer to generate a reference signal for the cell based on the reference signal sequence, and
instructions for causing the at least one computer to determine a first index and a second index based on the cell ID, wherein the instructions for causing the at least one computer to generate the pseudo-random sequence includes instructions for causing the at least one computer to generate the pseudo-random sequence based on the first index, and wherein the instructions for causing the at least one computer to generate the scrambling sequence includes instructions for causing the at least one computer to generate the scrambling sequence based on the second index.

19. The computer program product of claim 18, wherein the non-transitory computer-readable medium further includes:
instructions for causing the at least one computer to generate a primary synchronization code (PSC) sequence based on the second index;
instructions for causing the at least one computer to generate a secondary synchronization code (SSC) sequence based on the first index;
instructions for causing the at least one computer to generate a primary synchronization signal for the cell based on the PSC sequence; and instructions for causing the at least one computer to generate a secondary synchronization signal for the cell based on the SSC sequence.

20. The computer program product of claim 18, wherein the instructions for causing the at least one computer to generate the scrambling sequence includes instructions for causing the at least one computer to generate the scrambling sequence based on a maximum length sequence (M-sequence) or Golay complementary sequences.

21. A method of receiving a reference signal in a wireless communication system, comprising:
generating a pseudo-random sequence based on a cell identity (ID) of a cell;
generating a scrambling sequence based on the cell ID;
generating a reference signal sequence based on the pseudo-random sequence and the scrambling sequence; and
processing a reference signal received from the cell based on the reference signal sequence;
wherein the generating the pseudo-random sequence includes generating the pseudo-random sequence based on a first index of the cell ID, and wherein the generating the scrambling sequence includes generating the scrambling sequence based on a second index of the cell ID.

22. The method of claim 21, further comprising:
detecting for a primary synchronization code (PSC) sequence from the cell;
determining the second index based on the detected PSC sequence;
detecting for a secondary synchronization code (SSC) sequence from the cell; and
determining the first index based on the detected SSC sequence.

23. The method of claim 21, wherein the processing the reference signal includes multiplying received symbols comprising the reference signal with symbols of the reference signal sequence to obtain detected symbols.

24. The method of claim 21, further comprising:
deriving a channel estimate for the cell based on the reference signal.

25. The method of claim 21, further comprising:
performing at least one of signal strength measurement, signal quality measurement, time tracking, frequency tracking, or noise estimation based on the reference signal.

26. An apparatus for wireless communication, comprising:
at least one processor configured to generate a pseudo-random sequence based on a cell identity (ID) of a cell, to generate a scrambling sequence based on the cell ID, to generate a reference signal sequence based on the pseudo-random sequence and the scrambling sequence, and to process a reference signal received from the cell based on the reference signal sequence;
wherein the at least one processor is configured to generate the pseudo-random sequence based on a first index of the cell ID, and to generate the scrambling sequence based on a second index of the cell ID.

27. The apparatus of claim 26, wherein the at least one processor is configured to detect for a primary synchronization code (PSC) sequence from the cell, to determine the second index based on the detected PSC sequence, to detect for a secondary synchronization code (SSC) sequence from the cell, and to determine the first index based on the detected SSC sequence.

28. The apparatus of claim 26, wherein the at least one processor is configured to derive a channel estimate for the cell based on the reference signal.

29. The apparatus of claim 26, wherein the at least one processor is configured to perform at least one of signal strength measurement, signal quality measurement, time tracking, frequency tracking, or noise estimation based on the reference signal.

* * * * *